United States Patent [19]
Suk

[11] Patent Number: 5,940,458
[45] Date of Patent: Aug. 17, 1999

[54] METHOD AND COMPENSATING FOR TIME ERROR OF TIME/FREQUENCY GENERATOR USING GLOBAL POSITIONING SYSTEM

[75] Inventor: Sang Beom Suk, Seoul, Rep. of Korea

[73] Assignee: Hyundai Electronics Industries Co., Ltd., Kyoungki, Rep. of Korea

[21] Appl. No.: 09/019,593

[22] Filed: Feb. 6, 1998

[30] Foreign Application Priority Data

Oct. 5, 1997 [KR] Rep. of Korea ................. 97-18109

[51] Int. Cl.⁶ .................................................. H03D 3/24
[52] U.S. Cl. ................................... 375/376; 375/355
[58] Field of Search ................................. 375/200, 202, 375/203, 344, 355, 367, 376; 370/503, 516

[56] References Cited

U.S. PATENT DOCUMENTS

| | | | |
|---|---|---|---|
| 3,520,128 | 7/1970 | Novikov et al. | 368/47 |
| 4,005,266 | 1/1977 | Lehr et al. | 375/356 |
| 4,280,099 | 7/1981 | Rattlingourd | 327/160 |
| 4,582,434 | 4/1986 | Plangger et al. | 368/46 |
| 4,587,661 | 5/1986 | Schiff | 375/206 |
| 5,019,824 | 5/1991 | Kumar | 342/195 |
| 5,465,277 | 11/1995 | Schreurs et al. | 375/376 |
| 5,510,797 | 4/1996 | Abraham et al. | 342/352 |
| 5,697,082 | 12/1997 | Greer et al. | 455/255 |
| 5,751,777 | 5/1998 | Zampetti | 375/376 |

*Primary Examiner*—Temesghen Ghebretinsae
*Assistant Examiner*—Lenny Jiang
*Attorney, Agent, or Firm*—Blank Rome Comisky & McCauley LLP

[57] ABSTRACT

A method for compensating for a time error of a time/frequency generator using a GPS which generates a signal to be used as the time/frequency source of a base station and an exchange in a CDMA mobile communication system, or to be used for the synchronization between the existing telephone exchanges. A time error estimation operation is performed for 600 seconds starting at a multiple of 1200 seconds while a least square estimation operation is advanced for the frequency estimation. Then, the time error is controlled in accordance with the estimated result, and an input data control value is compensated so that no error can occur in the frequency estimation operation based on the least square estimation. Therefore, the time error is compensated during the frequency estimation operation based on the least square estimation.

4 Claims, 3 Drawing Sheets

METHOD AND COMPENSATING FOR TIME ERROR OF TIME/FREQUENCY GENERATOR USING GLOBAL POSITIONING SYSTEM

BACKGROUND OF THE INVENTION

1. Field of the Invention

The present invention relates to a method for compensating for a time error of a time/frequency generator using a global positioning system (referred to hereinafter as GPS) which generates a signal to be used as the time/frequency source of a base station and an exchange in a code division multiple access (CDMA) mobile communication system, or to be used for the synchronization between the existing telephone exchanges.

2. Description of the Prior Art

FIG. 1 is a block diagram of a time/frequency generator using a GPS. As shown in this drawing, the time/frequency generator comprises a GPS signal receiver 1 for receiving a 1PPS signal 8 from the GPS, a comparator 2 for comparing the 1PPS signal 9 received by the GPS signal receiver 1 with an internal 1PPS signal 9, a processor 3 for analyzing an output signal from the comparator 2, a digital/analog converter 4 for converting a digital signal from the processor 3 into an analog signal, an internal oscillator 5 for generating a 10 MHz signal, a frequency divider 6 for dividing a frequency of the 10 MHz signal generated by the internal oscillator 5 to generate the internal 1PPS signal 9, and a variable phase delay 7 for delaying a phase of the internal 1PPS signal 9 generated by the frequency divider 6 and outputting the resultant internal 1PPS signal 10 to the comparator 2.

The operation of the time/frequency generator with the above-mentioned construction will hereinafter be described.

First, the internal oscillator 5 generates the 10 MHz signal, the frequency of which is then divided by the frequency divider 6 to generate the internal 1PPS signal 9. The internal 1PPS signal 9 generated by the frequency divider 6 is delayed in phase by the variable phase delay 7, and the resulting delayed internal 1PPS signal 10 is fed to the comparator 2. The comparator 2 compares the 1PPS signal 8 received by the GPS signal receiver 1 with the internal 1PPS signal 10 fed by the variable phase delay 7 and outputs the compared result to the processor 3. The processor 3 processes the result compared by the comparator 2 and outputs the processed result to the digital/analog converter 4, which then converts it into an analog signal to control the signal generation of the internal oscillator 5.

The above-mentioned time/frequency generator using the GPS is adapted to provide a 1PPS signal in synchronization with a universal time coordinate (referred to hereinafter as UTC), not shown, by comparing and analyzing the 1PPS signal 8 received by the GPS signal receiver 1 with the internal 1PPS signal 10 derived from the internal oscillator 5 and delayed. The 1PPS signal 8 received by the GPS signal receiver 1 is beyond the UTC on the order of the maximum ±300 nsec and has a large time variation at every second. However, the 1PPS signal 8 received by the GPS signal receiver 1 has no error accumulation over a long period of time. On the other hand, the internal 1PPS signal 9, obtained by dividing the frequency of the 10 MHz signal from the internal oscillator 5, has a fixed time variation at every second, but is liable to continue to flow unidirectionally when it is left under no control as it is. The characteristic of the oscillator 5 can be recognized by comparing and estimating the two 1PPS signals 8, 10 with the above-mentioned different properties. Hence, the oscillator 5 can be controlled in accordance with the recognized result.

In the above-mentioned time/frequency generator using the generic GPS, however, a time error control operation is not performed during the frequency estimation operation, resulting in the occurrence of a large time error due to a frequency error after the frequency estimation operation is completed. Such a large time error causes a considerable amount of time jump, which is fatally disadvantageous to a system requiring a stable time.

Accordingly, an apparatus or a method for more efficiently compensating for the time error is required for the system stability.

An example of such a time error compensating apparatus is shown in U.S. Pat. No. 4,280,099.

This patent relates to a digital timing recovery system for compensating for a time error of a timing clock signal. The digital timing recovery system comprises an oscillator for generating a fixed frequency signal, clock derivation means for dividing a frequency of the fixed frequency signal from the frequency generator by m to derive the clock signal therefrom, data transition detector means for detecting transitions of received data, time comparison means coupled to the oscillator, clock derivation means and data transition detector means for comparing output signals therefrom with one another, and update means for updating the value of m in response to the results compared by the time comparison means.

In the above patent, the phase of the received data is detected by a phase detector and the transition thereof is detected by the data transition detector means at the detected phase. The clock derivation means is adapted to derive the clock signal from the fixed frequency signal generated by the oscillator by dividing the frequency thereof by m. The time comparison means is adapted to compare the time at which the data transition occurs, with the time at which a clocking transition of the clock signal occurs. The update means is adapted to update the value of m in accordance with the results compared by the time comparison means. In this manner, the timing clock signal is recovered.

The above-mentioned digital timing recovery system is advantageous in that it generates the clock signal more accurately by detecting a phase error of the received data and compensating for an error of the clock signal according to the detected phase error.

However, the above-mentioned digital timing recovery system has a disadvantage in that it compensates for only a time error, not for a frequency error. For this reason, the above-mentioned digital timing recovery system is limited in the application to a time/frequency generator using a GPS requiring the compensation for both the time and frequency errors. Moreover, further hardware must be configured.

SUMMARY OF THE INVENTION

Therefore, the present invention has been made in view of the above problem, and it is an object of the present invention to provide a method for compensating for a time error of a time/frequency generator using a GPS, in which the time error is estimated while a least square estimation operation is advanced for the frequency estimation, and then controlled in accordance with the estimated result.

In accordance with one aspect of the present invention, there is provided a method for compensating for a time error of a time/frequency generator using a global positioning system, the time/frequency generator having a global positioning system signal receiver for receiving a frequency signal from the global positioning system, a comparator for comparing the frequency signal received by the global positioning system signal receiver with an internal frequency signal, an oscillator for generating the internal frequency signal, a frequency divider for dividing a frequency of the internal frequency signal from the oscillator, a phase delay for delaying a phase of an output signal from the frequency divider, and a processor for estimating and processing an error of the internal frequency signal from the oscillator in accordance with the result compared by the comparator, comprising the first step of performing a time estimation operation with respect to the internal frequency signal from the oscillator for a first period of predetermined time; the second step of performing a frequency estimation operation with respect to the internal frequency signal from the oscillator for a second period of the predetermined time; the third step of repeating the time and frequency estimation operations at an interval of twice the predetermined time; the fourth step of controlling the time error in accordance with the results of the time and frequency estimation operations; and the fifth step of compensating for an input data control value to allow no error to occur in the frequency estimation operation; whereby the time error is compensated while the frequency estimation operation is advanced.

In accordance with another aspect of the present invention, there is provided a method for compensating for a time error of a time/frequency generator using a global positioning system, comprising the first step of tracking a satellite and checking the reception of a clock signal from the global positioning system to go to an estimation status; the second step of calculating and controlling the time error after the first step is completed; and the third step of calculating and controlling a frequency error after the second step is completed.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
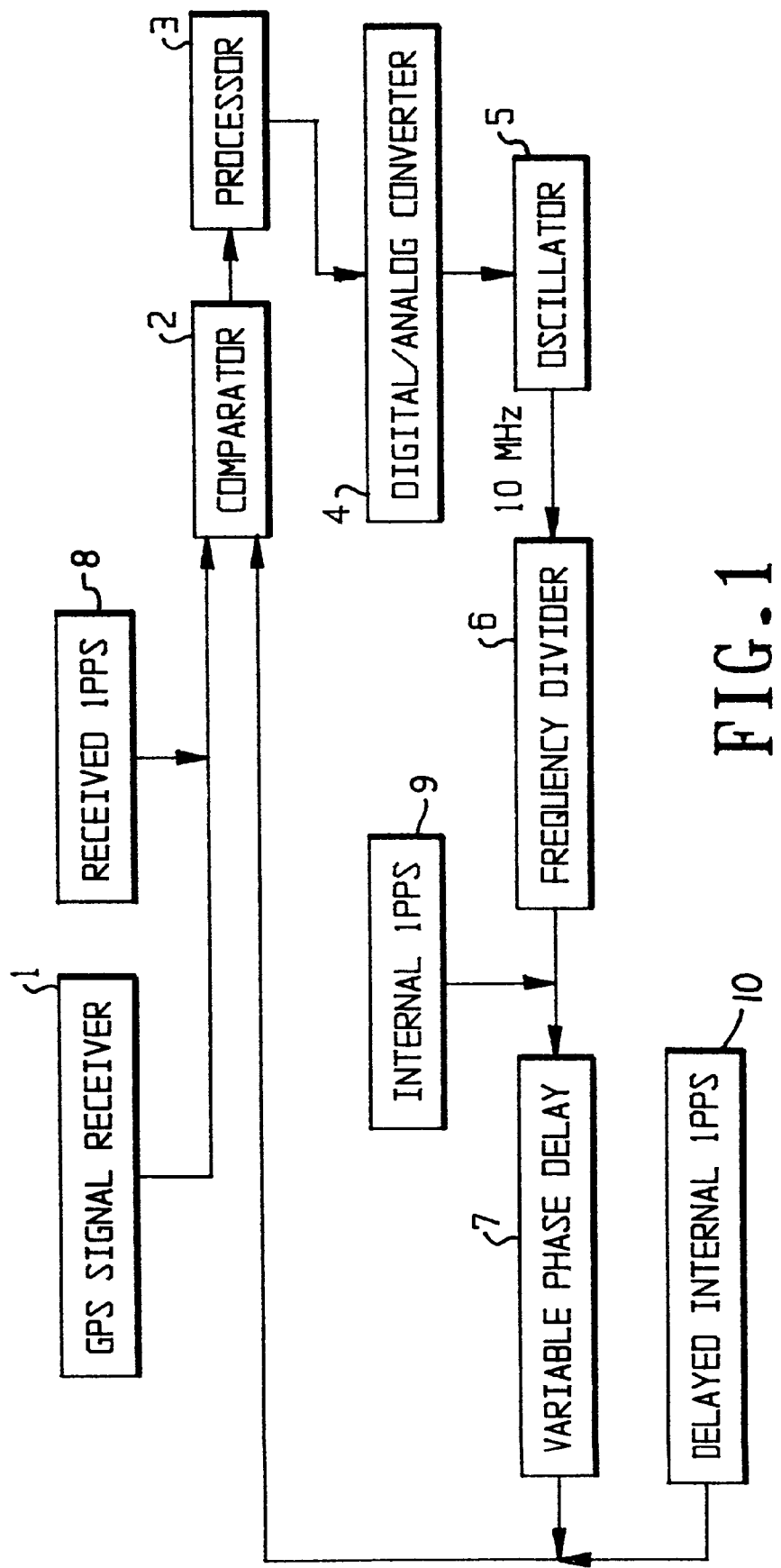
FIG. 1 is a block diagram of a time/frequency generator using a GPS.

In accordance with the present invention, in the time/frequency generator using the GPS, comprised of the GPS signal receiver, comparator, processor, oscillator, frequency divider and variable phase delay, as shown in FIG. 1, a time error estimation operation is performed for 600 seconds starting at a multiple of 1200 seconds while a least square estimation operation is advanced for the frequency estimation. Then, a time error is controlled in accordance with the estimated result, and an input data control value is compensated so that no error can occur in the frequency estimation operation based on the least square estimation. Therefore, the time error is compensated during the frequency estimation operation based on the least square estimation.

Figure 2:
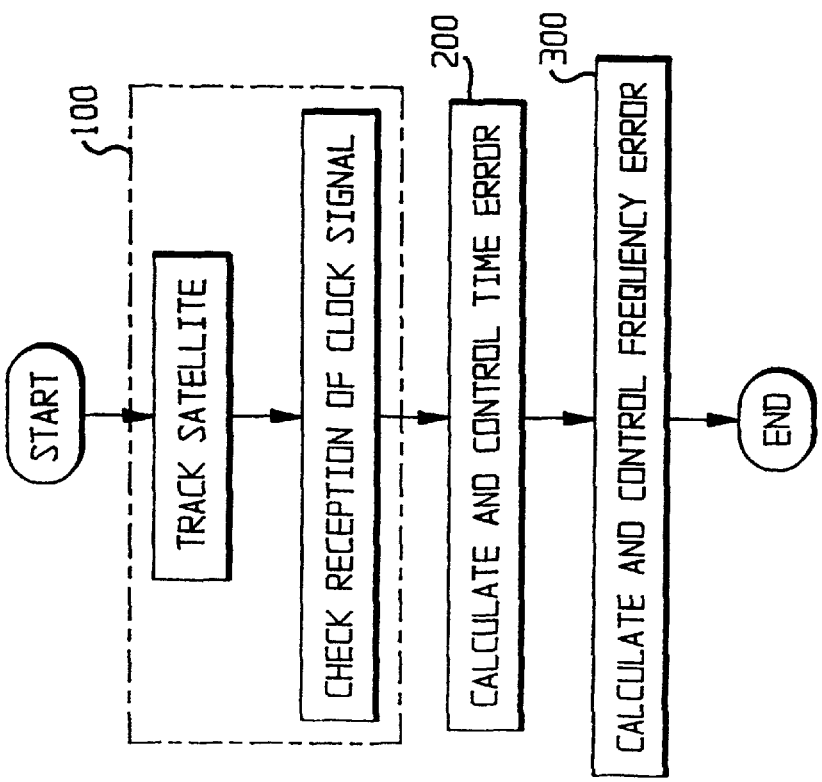
FIG. 2 is a flowchart illustrating a method for compensating for a time error of the time/frequency generator in FIG. 1 in accordance with the present invention.

FIG. 2 is a flowchart illustrating a method for compensating for a time error of the time/frequency generator in FIG. 1 in accordance with the present invention. This drawing shows how the time error estimation operation is performed while the frequency estimation operation is advanced. As shown in this drawing, the time error compensating method comprises an initialization step 100 of tracking a satellite and checking the reception of a clock signal from the GPS to go to an estimation status, a time error processing step 200 of calculating and controlling the time error after the initialization step 100 is completed, and a frequency error processing step 300 of calculating and controlling a frequency error after the time error processing step 200 is completed.

Figure 3:
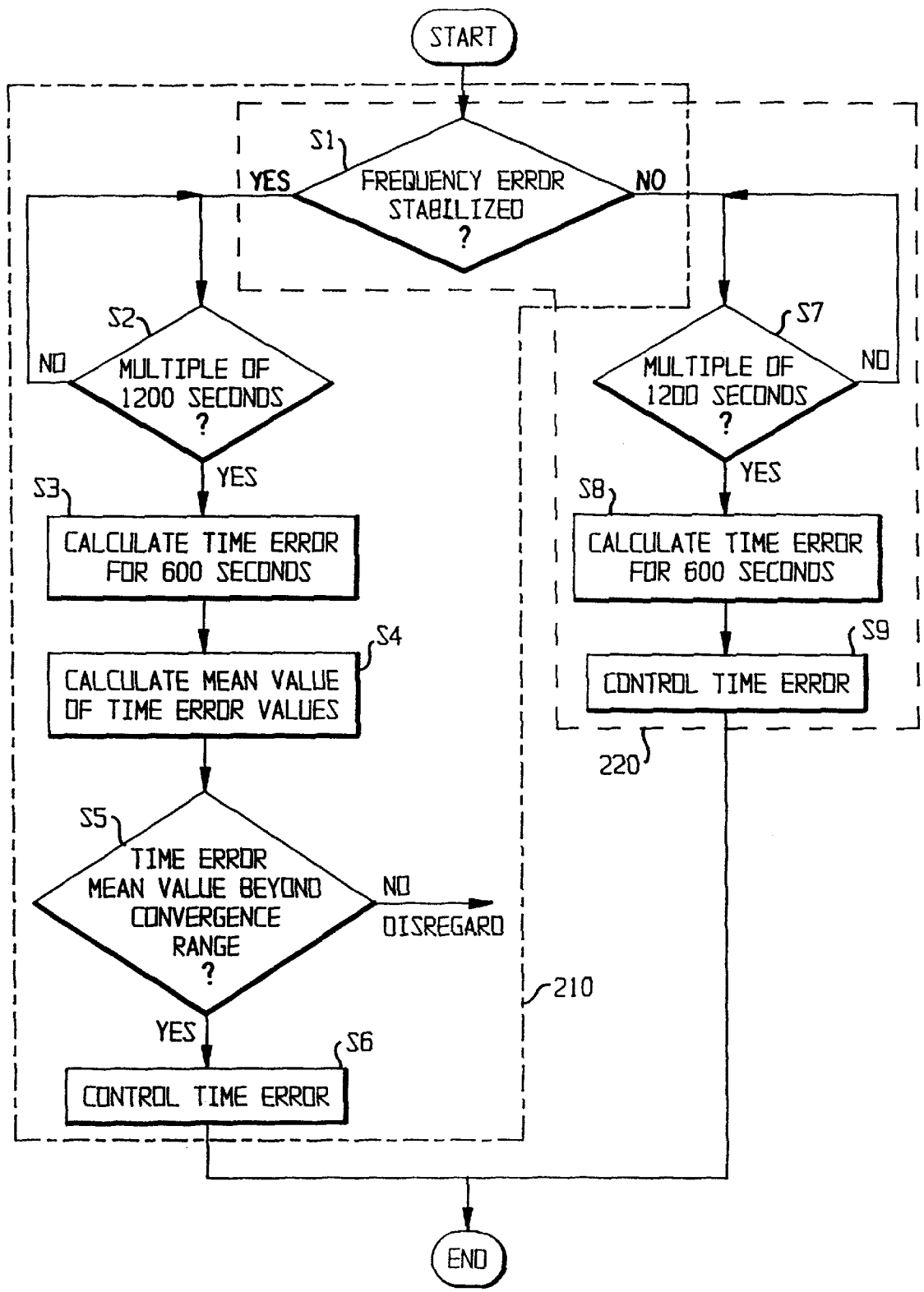
FIG. 3 is a flowchart illustrating a time error processing step in FIG. 2.

FIG. 3 is a flowchart illustrating the time error processing step 200 in FIG. 2. As shown in this drawing, the time error processing step 200 includes first and second time error processing steps 210 and 220.

The first time error processing step 210 includes the first step S1 of checking whether the frequency error has been stabilized, the second step S2 of, if the frequency error has been stabilized at the first step S1, checking whether an estimation counter has reached a multiple of 1200, or whether the current time has reached a multiple of 1200 seconds, the third step S3 of calculating the time error for 600 seconds if the estimation counter has reached a multiple of 1200 at the second step S2, the fourth step S4 of calculating a mean value of time error values calculated at the third step S3, the fifth step S5 of checking whether the time error mean value calculated at the fourth step S4 is beyond a convergence range of the time error, and the sixth step S6 of controlling the time error on the basis of the time error mean value calculated at the fourth step S4 if the calculated time error mean value is beyond the convergence range of the time error at the fifth step S5. In other words, at the first time error processing step 210, the time error is calculated and controlled under the condition that the frequency error is stabilized.

The second time error processing step 220 includes the first step S1 of checking whether the frequency error has been stabilized, the second step S7 of, if the frequency error has not been stabilized at the first step S1, checking whether the estimation counter has reached a multiple of 1200, or whether the current time has reached a multiple of 1200 seconds, the third step S8 of calculating the time error for 600 seconds if the estimation counter has reached a multiple of 1200 at the second step S7, and the fourth step S9 of controlling the time error on the basis of time error values calculated at the third step S8. In other words, at the second time error processing step 220, the time error is calculated and controlled under the condition that the frequency error is not stabilized.

In the case where the frequency error is stabilized, a decision is made as to whether the time error is beyond a 1PPS convergence range of the time/frequency generator using the GPS. Then, the time error is controlled only when it is beyond the 1PPS convergence range of the time/frequency generator.

The convergence range is set for the purpose of removing, to a certain extent, an error amount due to a noise occurring in the time/frequency generator. A control value for time error values beyond the convergence range is determined in consideration of a range having no effect on the stability of the 1PPS signal. In the case where the time error is to be controlled during the frequency estimation operation, an input data value to the comparator 2 which is a reference of the frequency estimation will be corrected to allow the time error control to have no effect on the frequency estimation.

On the other hand, in the case where the frequency error is not stabilized, the time error is controlled in a full scale.

Figure 4:
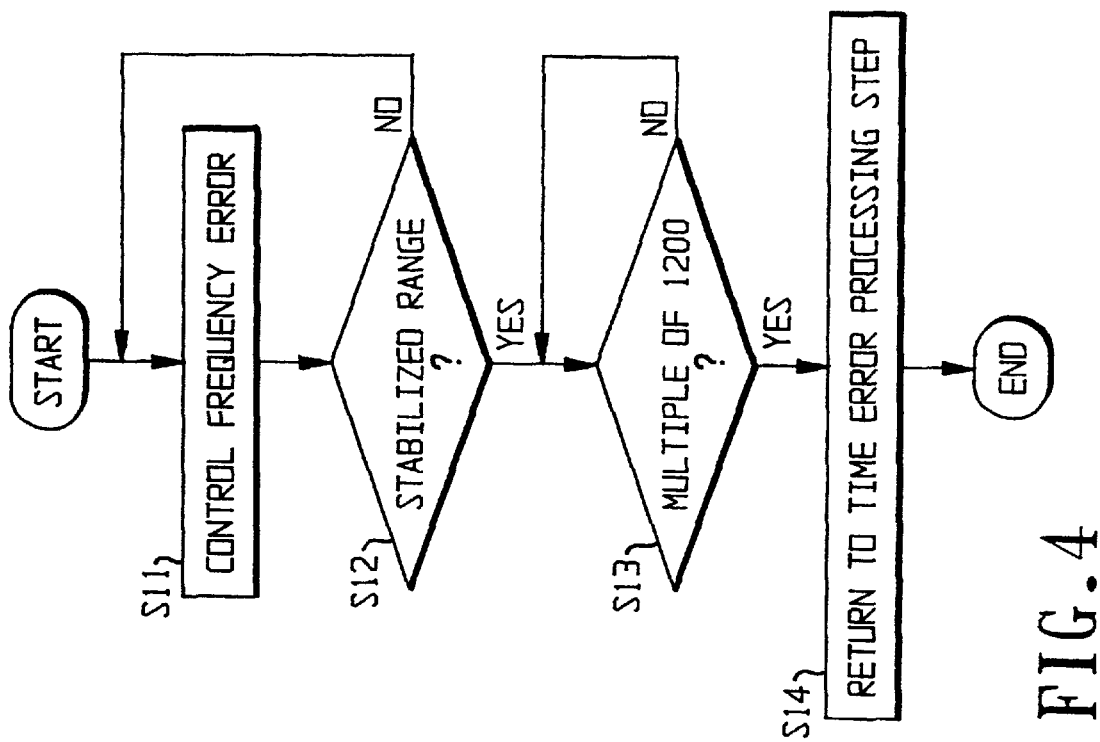
FIG. 4 is a flowchart illustrating a frequency error processing step in FIG. 2.

FIG. 4 is a flowchart illustrating the frequency error processing step 300 in FIG. 2. As shown in this drawing, the frequency error processing step 300 includes the first step S11 of controlling the frequency error, the second step S12 of, after the first step S11 is performed, checking whether the frequency error has entered a stabilized range and returning to the first step S11 if the frequency error has not entered the stabilized range, the third step S13 of, if the frequency error has entered the stabilized range at the second step S12, checking whether an estimation counter has reached a multiple of 1200, and the fourth step S14 of returning to the time error processing step 200 if the estimation counter has reached a multiple of 1200 at the third step S13.

In other words, the time error is processed for one period of 600 seconds and the frequency error is processed for the next period of 600 seconds. As a result, the time and frequency errors are repeatedly processed at an interval of 1200 seconds.

The above-mentioned time error compensating method of the present invention will hereinafter be described in more detail with reference to FIG. 1.

Referring again to FIG. 1, the oscillator 5 generates the frequency signal under the control of the processor 3 upon system-on. The frequency signal generated by the oscillator 5 is fed back to the comparator 2. Then, the comparator 2 compares the frequency signal from the oscillator 5 with the frequency signal received by the GPS signal receiver 1 and outputs the compared result to the processor 3. The processor 3 estimates an error of the frequency signal generated by the oscillator 5 on the basis of the result compared by the comparator 2 and controls the oscillator 5 in accordance with the estimated result. In this manner, the processor 3 compensates for an error of the frequency signal generated by the oscillator 5.

First, the processor 3 performs a time estimation operation with respect to the frequency signal generated by the oscillator 5 for one period of 600 seconds and controls the oscillator 5 in accordance with the estimated result to compensate for a time error of the generated frequency signal. Then, the processor 3 performs a frequency estimation operation based on the least square estimation with respect to the frequency signal generated by the oscillator 5 for the next period of 600 seconds and controls the oscillator 5 in accordance with the estimated result to compensate for a frequency error of the generated frequency signal, so as to stabilize it. Again, the processor 3 repeats the above procedure. Namely, the time estimation operation is repeatedly performed at every multiple of 1200 seconds. The time error is processed in different manners according to the stabilized state of the frequency error. Under the condition that the frequency error is stabilized, the time error is compensated only when it is beyond the 1PPS convergence range of the time/frequency generator. However, in the case where the frequency error is not stabilized, the time error is compensated regardless of the convergence range.

The time error is processed in consideration of the frequency error, as mentioned above. As a result, the present method can compensate, to a certain extent, even for an error occurring inasmuch as the frequency estimation operation is not performed during the time estimation operation.

As apparent from the above description, the time error compensation operation is performed together with the frequency estimation operation based on the least square estimation. Therefore, as compared with the prior art where a large time error occurs due to a frequency error after the frequency estimation operation because the time estimation operation is not performed during the frequency estimation operation, the present invention has the effect of significantly reducing a time error amount.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for compensating for a time error of a time/frequency generator using a global positioning system, said time/frequency generator having a global positioning system signal receiver for receiving a frequency signal from said global positioning system, an oscillator for generating a frequency signal, a frequency divider for dividing a frequency of said frequency signal from said oscillator to produce an internal frequency signal, a phase delay for delaying a phase of said internal frequency signal to produce a delayed internal frequency signal, a comparator for comparing said frequency signal received by said global positioning system signal receiver with said delayed internal frequency signal to provide a result of comparison, and a processor for estimating and processing an error of said frequency signal from said oscillator in accordance with said result of comparison, said method comprising the steps of:

(a) performing a time estimation operation with respect to said frequency signal generated by said oscillator for a first period of predetermined time;

(b) performing a frequency estimation opeatoin with respect to said frequency signal generated by said oscillator for a second period of said predetermined time;

(c) repeating said time and frequency estimation operations at an interval of twice said predetermined time;

(d) controlling said time error in accordance with results of said time and frequency estimation operations;

(e) compensating for an input data control value to prevent an error from occurring in said frequency estimation operation;

(f) tracking a satellite and checking a reception of a clock signal from said global positioning system to go to an estimation status;

(g) calculating and controlling said time error after step (f) is completed; step (g) comprising the steps of:

(g-1) calculating and controlling said time error under a condition that said frequency error is stabilized, step (g-1) comprising the steps of:

(g-1-1) checking whether said frequency error has been stabilized;

(g-1-2) if said frequency error has been stabilized at said step (g-1-1), checking whether an estimation counter has reached a multiple of 1200, or whether the current time has reached a multiple of 1200 seconds;

(g-1-3) calculating said time error for 600 seconds if said estimation counter has reached a multiple of 1200 at said step (g-1-2);

(g-1-4) calculating a mean value of time error values calculated at said step (g-1-3);

(g-1-5) checking whether said time error mean value calculated at said step (g-1-4) is beyond a convergence range of said time error; and (g-1-6) controlling said time error on the basis of said time error mean value calculated at said step (g-1-4) if the calculated time error mean value is beyond said convergence range of said time error at said step (g-1-5); and (g-2) calculating and controlling said time error under a condition that said frequency error is not stabilized, step (g-2) comprising the steps of:

(g-2-1) checking whether said frequency error has been stabilized;

(g-2-2), if said frequency error has not been stabilized at said step (g-2-1), checking whether an estimation counter has reached a multiple of 1200, or whether the current time has reached a multiple of 1200 seconds;

(g-2-3) calculating said time error for 600 seconds if said estimation counter has reached a multiple of 1200 at said step (g-2-2); and (g-2-4) controlling said time error on the basis of time error values calculated at said step (g-2-3); and (h) calculating and controlling a said frequency error after step (g) is completed.

2. A method for compensating for a time error of a time/frequency generator using a global positioning system, as set forth in claim 1, wherein said convergence range of said time error is set to a 1PPS value for removing, to a certain extent, an error amount due to a noise occurring in said time/frequency generator.

3. A method for compensating for a time error of a time/frequency generator using a global positioning system, as set forth in claim 1, wherein said step (g-2-4) includes the step of controlling said time error in a full scale in consideration of the fact that said frequency error is not stabilized.

4. A method for compensating for a time error of a time/frequency generator using a global positioning system, as set forth in claim 1, wherein said step (h) includes the steps of:

(h-1) controlling said frequency error until it enters a stabilized range;

(h-2) checking whether said frequency error has entered said stabilized range;

(h-3) if said frequency error has entered said stabilized range at said step (h-2), checking whether an estimation counter has reached a multiple of 1200; and (h-4) returning to said step (g) if said estimation counter has reached a multiple of 1200 at said step (h-3).

* * * * *

UNITED STATES PATENT AND TRADEMARK OFFICE
CERTIFICATE OF CORRECTION

| | |
|---|---|
| PATENT NO. | : 5,940,458 |
| APPLICATION NO. | : 09/019593 |
| DATED | : August 17, 1999 |
| INVENTOR(S) | : Sang Beom Suk |

It is certified that error appears in the above-identified patent and that said Letters Patent is hereby corrected as shown below:

On Title page Item [30] Foreign Application Priority Data, the date which is set forth as "Oct. 5, 1997" should read -- May 10, 1997 --. As such, the complete line regarding the Foreign Application Priority Data should read as follows:

May 10, 1997 [KR] Rep. of Korea ................. 97-18109

Signed and Sealed this

Thirtieth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 5,940,458
APPLICATION NO. : 09/019593
DATED : August 17, 1999
INVENTOR(S) : Sang Beom Suk It is certified that error appears in the above-identified patent and that said Letters Patent is hereby corrected as shown below:

On both the face the patent and at col. 1, lines 1-4, the title of the patent is incorrectly shown as "METHOD AND COMPENSATING FOR TIME ERROR OF TIME/FREQUENCY GENERATOR USING GLOBAL POSITIONING SYSTEM."

The correct title is "METHOD FOR COMPENSATING FOR TIME ERROR OF TIME/FREQUENCY GENERATOR USING GLOBAL POSITIONING SYSTEM."

Signed and Sealed this

Twenty-ninth Day of June, 2010

David J. Kappos
*Director of the United States Patent and Trademark Office*